Sept. 6, 1960  A. MARZOCCHI ET AL  2,951,772
TREATMENTS FOR FIBROUS GLASS USED TO REINFORCE RESINS
Filed Dec. 10, 1956

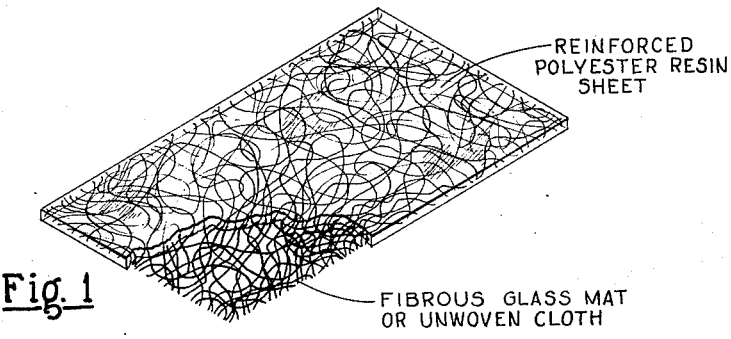

Fig.1 — REINFORCED POLYESTER RESIN SHEET / FIBROUS GLASS MAT OR UNWOVEN CLOTH

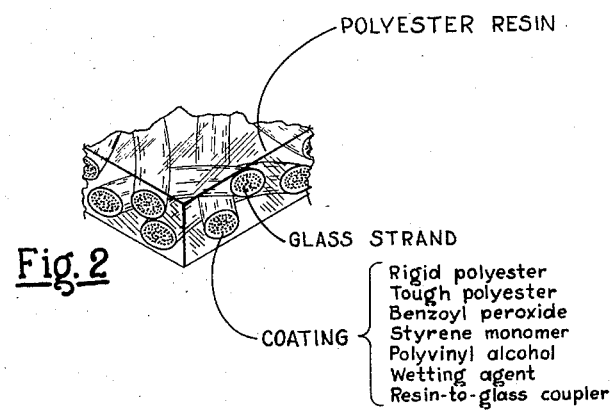

Fig.2 — POLYESTER RESIN / GLASS STRAND / COATING { Rigid polyester, Tough polyester, Benzoyl peroxide, Styrene monomer, Polyvinyl alcohol, Wetting agent, Resin-to-glass coupler }

ALFRED MARZOCCHI &
NICHOLAS S. JANETOS
INVENTORS

BY
ATTORNEYS

United States Patent Office 2,951,772
Patented Sept. 6, 1960

2,951,772
TREATMENTS FOR FIBROUS GLASS USED TO REINFORCE RESINS

Alfred Marzocchi, Pawtucket, and Nicholas S. Janetos, Providence, R.I., assignors to Owens-Corning Fiberglas Corporation, a corporation of Delaware Filed Dec. 10, 1956, Ser. No. 627,147

11 Claims. (Cl. 117—126)

This invention relates to the preparation of fibrous glass to be used in reinforced resin products, and more particularly to treatments for fibrous glass which is to be used to reinforce polyester resin laminates and the like.

Glass fibers have been used as a reinforcement and as a strengthening and flexibilizing agent in combination with resinous materials employed in the manufacture of fibrous glass reinforced plastics, laminates and coated fabrics. In producing such materials, it is necessary to achieve a tight bond between the smooth glass surfaces and the resin which the glass is reinforcing. This bond must be resistant to heat and water and must have a long, useful life.

It is an object of this invention to provide an improved treating composition for application to fibers which are to reinforce polyester resins.

It is a further object to provide a soft pliable mat which is easily draped in the desired configuration in the manufacture of reinforced resin products.

It is an object to provide an improved fibrous glass reinforcement for resins.

The compositions of this invention may be used as size materials which are applied at forming; however, they are preferably used as a binder for fibrous glass products such as mat or unwoven fabric. The fibers are formed by attenuating molten streams of glass into continuous, small diameter fibers which are collected together in the form of a strand. The fibers may be attenuated by various means including the use of a pair of pulling wheels or a single pulling wheel which advance a bundle of fibers at high speeds of up to 10,000 feet per minute or more. Just prior to the introduction of the fibers onto the surface of the pulling wheel, a plurality of the fibers are gathered together in the form of a bundle. A liquid treating material such as water is applied to the individual fibers just prior to the time they are gathered together as a strand. The bundle of fibers are then introduced onto a collecting chain to form a mat product. In normal practice a number of pulling devices direct the strand product toward a single conveyor to form a mat having sufficient width, as may be desired. The mat-like product is advanced while the treating compositions of this invention are flooded onto the mat and the excess treating material is removed by suction. The strand may be deposited after it is chopped or it may be collected in swirls of continuous material.

In the drawing,

Figure 1 is a view partially broken away of a reinforced resin sheet; and

Figure 2 is a greatly enlarged view of a treated glass fiber reinforced polyester resin.

The treating compositions of thin invention comprise a combination of one or more polyester resins with a suitable coupling agent for attaching the polyester resin to the glass surface, materials to stabilize the treating composition which is in emulsion form, and a monomer which is added to enhance the emulsification and to provide reactivity within the treating composition.

The following is given as representative of a composition embodying the features of this invention:

Example 1

6.0 percent by weight polyester resin (Paraplex P–47)
1.0 percent by weight polyester resin (Paraplex P–13)
0.1 percent by weight benzoyl peroxide
0.4 percent by weight styrene monomer
0.15 percent by weight polyvinyl alcohol (Elvanol 52–22 solution, 5 percent solids)
0.35 percent by weight wetting agent (Pluronic F–68)
0.8 percent by weight tris beta methoxy ethoxy vinyl silane (Linde A–172)
91.20 percent by weight water The composition is adjusted in pH by the addition of acetic or formic acid, other acids including hydrochloric or sulfuric likewise may be added to maintain the pH on the acid side. The above materials are mixed as follows. The polyester resins are added to the mixing tank and the Lightnin mixer started. The first polyester has a relatively high viscosity and provides a tough, rigid, high impact strength polymer. The second polyester is a lower viscosity resin and provides a tough, flexible polymer. The more viscous polyester acts as a binder and the less viscous polyester acts as a plasticizer. The latter is softer and has less brittleness due to its low degree of cross linking. The wetting agent is then added and the benzoyl peroxide and styrene which have been mixed together in a separate container are added to the resin mixing tank. Thorough agitation is maintained in the resin mixing tank. The polyvinyl alcohol is added in small increments with vigorous agitation until all of the material has been added. Water is then added in increments to continue the emulsification.

In a separate mixing tank the coupling agent (tris beta methoxy ethoxy vinyl silane) is added slowly to water with agitation. Acetic acid is used to make the solution slightly acid. The resin emulsion is then pumped into the main mixing tank which contains the water and coupling agent. Agitation is continued until the binder is well blended. Additional water is added and the pH is once again corrected to from 4.5 to 5.0 by the addition of acetic acid. The above composition is applied by flooding the emulsion onto the fibers to be treated and removing the excess by allowing it to flow out of the fibrous glass product or by using suction means.

An admix composition having about 7.5 percent solids which can be used to maintain the solids of the initial circulating mix to provide a nominal ignition loss of 5.0 percent on the mat is prepared as follows:

Example 2

8.6 percent by weight polyester resin (Paraplex P–47)
1.4 percent by weight polyester resin (Paraplex P–13)
0.1 percent by weight benzoyl peroxide 0.4 percent by weight styrene monomer
0.2 percent by weight polyvinyl alcohol (Elvanol 52–22 solution, 5 percent solids)
0.3 percent by weight wetting agent (Pluronic F–68)
0.8 percent by weight coupling agent (Linde A–172)
88.2 percent by weight water These materials are mixed as were those ingredients in the main circulating emulsion.

A solution of polyvinyl alcohol is prepared in advance by adding the polyvinyl alcohol slowly to hot water with constant agitation.

The treating composition of Example 1 is applied by flooding the mat or unwoven fabric with the treating composition and removing the excess. The treating composition collects as a coating upon the fibers, see Figure 2 of the drawing.

Another method of applying the composition involves the application of the resin-to-glass coupler (tris beta methoxy ethoxy vinyl silane or the like) to the fibers as they are being gathered when making the bundle of fibers at forming. The solution of the coupling agent is kept on the acid side by the use of formic or acetic acid, or any other acid including hydrochloric or sulfuric acid may be used. After the strand is formed into a mat, the treating composition of Example 1 without any coupling agent is applied to the mat or unwoven fabric. It is preferred to mix the coupling agent with the other ingredients of the treating composition; however, the second method may be used, if desired. Regardless of which method is used in applying the treating composition, the treated mat or unwoven fabric is then introduced into a drying oven which is maintained at a temperature of from 300° F. to 400° F. Water is removed in this drying oven and a reaction between the polyester resin and styrene and between the two polyester resins themselves takes place.

The amount of treating composition applied may vary as desired. Generally it is desirable to make use of a composition in which the solids are present in an amount within the range of from 3 to 12 percent solids. The coating weight based upon the amount of solids applied to the glass fiber surfaces should range from about 3 to 10 percent. The amount of binder present is usually expressed as "percentage of ignition loss."

Various polyester resins may be used. It has been found that a combination of polyester resins, such as that shown in Example 1, is highly desirable in order to get strong bonds without too much attendant rigidity. A high viscosity resin such as the Paraplex P–47 which is a 70% solution of polyester resin in styrene provides a very rigid inflexible tough polymer. Paraplex P–47 is a styrene solution of a polyester resin which is the reaction product of diethylene glycol, maleic anhydride and phthalic acid. Paraplex P–13 is a styrene solution of polyester resin which is the reaction product of diethylene glycol, maleic anhydride and succinic acid. The Paraplex P–13 polyester resin which is a 50% solution of polyester resin in styrene acts as a plasticizer for the Paraplex P–47 resin and tends to soften the final bond and reduce the brittleness which would normally result from the use of Paraplex P–47 alone. Any polyester resin formed by condensation reaction of dibasic acid, at least a part of which is an unsaturated dibasic acid such as maleic anhydride, with a glycol may be used. Also, resins formed by condensation reaction of an oil fatty acid such as linseed fatty acid with a glycol may likewise be used. A polyester formed by the condensation reaction of a long chain linseed oil and phthalic acid may be used. Resinous mixes of unsaturated polyesters and copolymerizable monomers useful in practicing the present invention are disclosed fully in Ellis U.S. Patent 2,255,313.

Styrene monomer acts as a reactive solvent to enhance the reactivity and to act also as an emulsifier. The addition of styrene monomer has been normal practice when making rigid polyester resins. More cross linking and reactivity result from an addition of styrene to the resin components. Other monomers may be added in place of styrene.

The polyvinyl alcohol component operates in the treating composition to stabilize the emulsion. By maintaining the proper ratio of polyvinyl alcohol to coupling agent, greatly improved resistance to water is provided. It is desirable to keep the polyvinyl alcohol to coupling agent ratio on a weight basis from about 1:3 to 1:6 to provide the requisite resistance to water. It is believed that the polyvinyl alcohol coats the particles of resin and prevents them from coalescing.

Various surface active agents may be used, including such products as the reaction product of a diamine, ethylene oxide and lauric acid or nonionic fatty acid oxyethylene alcohols such as octylphenyl polyoxyethylene alcohols or compounds such as polyethylene glycol stearates or polyethylene glycol palmitates and the like. Instead of the above, use may be made of the reaction product of tetraethylene pentamine with epichlorohydrin and stearic acid or other fatty acid or of sorbitan mono-oleate polyoxyalkylene derivatives. Such emulsifying agents do not interfere with the establishment of a strong bonding relation between the resin and glass fibers. The water resistance is effected also by the ratio of wetting agent to coupler.

Various coupling agents may be used, for instance, gamma amino propyl triethoxy silane may be used or organo-silicon compounds having an organic group attached directly to the silicon atom in which the organic group contains less than 8 carbon atoms in aliphatic arrangement and which contains an ethylenic unsaturation may be used. Such organo-silicon compounds include vinyltriacetoxysilane, vinyltrichlorosilane, vinyltri(betamethoxy)ethoxysilane, allyldichlorosilane, allyltrichlorosilane, and the water soluble alkali metal salts of the corresponding silanols, such as the sodium salt of vinylsilanol and the like. Chromic complexes may also be used as the coupling agent. Such compounds include stearato chromic chloride or other Werner complex compounds having a carboxylato group coordinated with the trivalent nuclear chromium atom in which the carboxylato group is formulated to contain more than 10 carbon atoms. Use can also be made of stearyl silicon (diethyl ethanolamino hydrochloride)$_3$ and other similar fatty acid silicon salts.

Proportions of the ingredients may vary as indicated in the following examples:

*Example 3*

7–10 percent polyester resin (Paraplex P–47)
1–2 percent polyester resin (Paraplex P–13)
0.05–0.2 percent benzoyl peroxide
1–3 percent styrene monomer
.03–0.1 percent polyvinyl alcohol
0.1–9.6 percent surface active agent (ethylene oxide condensation with phenyl)
0.3–0.9 percent coupling agent
1–3 percent acetone
Remainder water

*Example 4*

8.5 percent polyester resin (Paraplex P–47)
1.5 percent polyester resin (Paraplex P–13)
0.1 percent benzoyl peroxide
2.0 percent styrene monomer
0.06 percent polyvinyl alcohol
0.3 percent wetting agent
0.6 percent vinyltrichlorosilane
2.0 percent acetone
Remainder water Acetone is used as a solvent in the treating compositions of Examples 3 and 4.

A high solids binder for 8 percent nominal ignition loss on a bonded strand mat is provided by the following composition:

Example 5

- 8.56 percent polyester resin (Paraplex P–47)
- 1.44 percent polyester resin (Paraplex P–13)
- 0.1 percent benzoyl peroxide
- 0.35 percent styrene monomer
- 0.2 percent polyvinyl alcohol
- 0.35 percent wetting (Pluronic F–68)
- 0.8 percent tris beta methoxy ethoxy vinyl silane
- 88.2 percent water An admix of approximately 10½ percent solids is used to maintain a proper solids level in the circulating mix of Example 5. Such an admix is prepared as follows:

Example 6

- 12.6 percent polyester resin (Paraplex P–47)
- 2.1 percent polyester resin (Paraplex P–13)
- 0.1 percent benzoyl peroxide
- 0.4 percent styrene monomer
- 0.2 percent polyvinyl alcohol
- 0.35 percent wetting agent (Pluronic F–68)
- 0.8 percent tris beta methoxy ethoxy vinyl silane
- 83.45 percent water These compositions are prepared in the same manner as that of Example 1.

Other catalysts besides benzoyl peroxide may be used. Organo-metallic compounds such as cobalt napthenate or other metallic drying agents or "kickers" may be used with the polyester resin. In addition to the silanes, silanols, and chrome complex compounds, titanium lactate or other titanium compounds may be used as the coupling agent for bonding the resin to the glass surface.

These compositions are especially adapted for treating glass which is to be combined with polyester resins. Such treatments can also be used for glass which is to be combined with epoxy resins with very minor modifications of the compositions. A small proportion of gamma amino propyl triethoxy silane sold by Linde and designated Y–1100 makes the compositions of this invention suitable for use with epoxy resins when making reinforced resin laminates or the like.

Some of the advantages gained by the use of such treating compositions on fibrous glass mat or unwoven cloth are as follows. It has been found that mats made utilizing the compositions of this invention may be very easily draped over forms having compound curves and sharp indentations. This ease of draping makes it possible to mold reinforced resin products which are exceptionally strong and of high quality since the glass is evenly distributed throughout the molded piece. It has also been found that the mat is very easily marked with a pencil so that pieces of mat of the proper size and configuration can be cut from a pattern and inserted onto a preform used in making reinforced resin products. After the mat with the treating compositions of this invention has been heated in an oven to drive off the water and to cure the resin, it is found that the mat feels wet without being sticky. The stickiness of the mat is believed to make it possible to mark the mat with an ordinary lead pencil. The mat can be easily shaped in the mold and is very pliable so that it is easily handled. These compositions do not only provide a bond for the fibers within the mat or unwoven fabric, but in addition, they provide the coupling agent and high bond strength between the resin and glass reinforcement in the molded and laminated products.

Various changes may be made in the composition formulation and application of treating compositions without departing from the spirit of the invention as defined in the following claims.

We claim:

1. Reinforced resin including a resin, glass fibers as a reinforcement and a coating on the glass fibers to improve processing characteristics of the fibers and to improve the bonding relationship between the resin and the glass fibers, the coating comprising the reaction product resulting from heating a 70 percent solution of a polyester resin in monomeric styrene, which resin is one formed by condensation reaction of dibasic acid, at least a part of which is an unsaturated dibasic acid with a glycol, and which cures alone to a tough, rigid polymer, a 50 percent solution of a polyester resin in monomeric styrene, which resin is one formed by condensation reaction of dibasic acid, at least a part of which is an unsaturated dibasic acid with a glycol, and which cures alone to a tough, flexible polymer, monomeric styrene, polyvinyl alcohol, a wetting agent, and a vinyl silane coupling agent, the materials being present in the ratio of 6 to 12.6 percent by weight of 70 percent polyester, 1 to 2.1 percent by weight of 50 percent polyester, 0.35 to 3 percent by weight of styrene, 0.03 to 0.2 percent by weight polyvinyl alcohol, 0.1 to 0.6 percent by weight of wetting agent, and 0.3 to 0.9 percent by weight of vinyl silane, wherein the polyvinyl alcohol to coupling agent ratio on a solids-weight basis is from 1:3 to 1:6.

2. A reinforced resin as in claim 1 in which the vinyl silane is tris beta methoxy ethoxy vinyl silane.

3. A reinforced resin as in claim 1 in which from 0.05 to 0.2 percent by weight of benzoyl peroxide catalyst is added to the coating.

4. The reinforced resin as in claim 1 in which the vinyl silane is vinyl trichlorosilane.

5. For the production of fibrous glass reinforced resin products, the improvement comprising the application of a treating composition to the surfaces of the fibrous glass and curing of the treating composition prior to combination with the resin to be reinforced, the treating composition comprising an aqueous composition containing from 6 to 12.6 percent by weight of a 70 percent solution of polyester resin in monomeric styrene, which polyester resin is one formed by condensation reaction of dibasic acid, at least a part of which is an unsaturated dibasic acid with a glycol, and which cures alone to a tough, rigid polymer, from 1 to 2.1 percent by weight of a 50 percent solution of a polyester resin in monomeric styrene, which resin is one formed by condensation reaction of dibasic acid, at least a part of which is an unsaturated dibasic acid with a glycol, and which cures alone to a tough, flexible polymer, 0.35 to 3 percent by weight of monomeric styrene, 0.03 to 0.2 percent by weight of polyvinyl alcohol, 0.1 to 0.6 percent by weight of a wetting agent, and from 0.3 to 0.9 percent by weight of a vinyl silane, the ratio of polyvinyl alcohol to vinyl silane on a solids-weight basis being from 1:3 to 1:6.

6. The process of claim 5 in which the vinyl silane is tris beta methoxy ethoxy vinyl silane.

7. The process of claim 5 in which the vinyl silane is vinyl trichlorosilane.

8. The process of claim 5 in which from 0.05 to 0.2 percent by weight of benzoyl peroxide catalyst is added to the treating composition.

9. The process of claim 5 wherein the treating composition is cured by heating to a temperature sufficient to form a reaction product.

10. Glass fibers arranged in the form of a mat and bonded with a reaction product obtained by heating an applied coating on the fiber surfaces, the coating comprising an aqueous composition containing from 6 to 12.6 weight percent of a 70 percent solution of a polyester in monomeric styrene, which polyester is one formed by condensation reaction of dibasic acid, at least a part of which is an unsaturated dibasic acid with a glycol, and which cures alone to a tough, rigid polymer, from 1 to 2.1 weight percent of a 50 percent solution of a polyester resin in monomeric styrene, which resin is one formed by condensation reaction dibasic acid, at least a part of which is an unsaturated dibasic acid with a glycol, and which cures alone to a tough, flexible polymer, 0.35 to 3 weight percent of monomeric styrene, 0.03 to 0.2 weight percent of polyvinyl alcohol, and from 0.3 to 0.9 weight percent of a silane.

11. The glass fibers of claim 10 wherein the coating is from 3 to 10 percent of the total weight of the fiber and coating.

References Cited in the file of this patent

UNITED STATES PATENTS

| | | |
|---|---|---|
| 2,754,237 | Brooks | July 10, 1956 |
| 2,801,189 | Collier | July 30, 1957 |

OTHER REFERENCES

"Pittsburgh Selectron Polyester Reinforcing Resins," pages 3, 9 and 10. Reprinted January 1955.

"Tailor-Made Polyester Resins," Modern Plastics, October 1947, pages 111–115.

"Polyesters and Their Applications," Bjorksten Research Laboratories, Inc., Reinhold Publishing Corp., 1956, page 89 and page 137.